July 7, 1953

W. A. BEDFORD, JR 2,644,213

LOCKING STUD TYPE MOLDING FASTENER

Filed Dec. 9, 1947

Inventor

WILLIAM A. BEDFORD JR.

By Philip E. Parker

Attorney

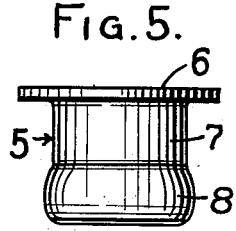
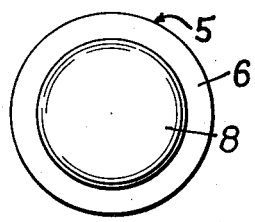
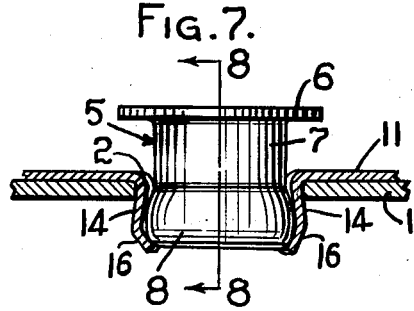
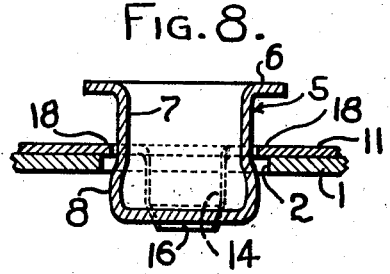
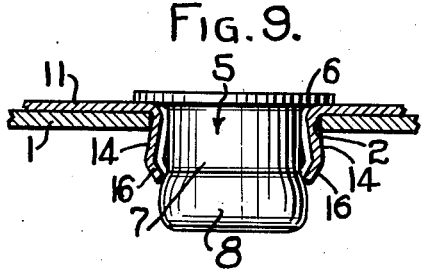
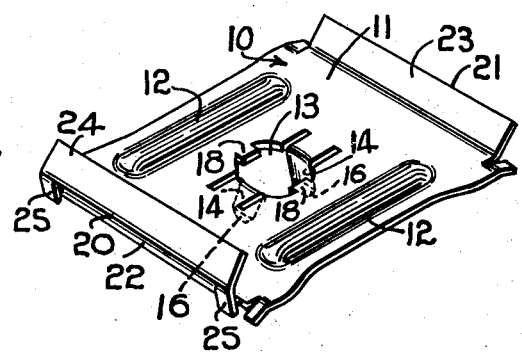

Patented July 7, 1953

2,644,213

UNITED STATES PATENT OFFICE 2,644,213

LOCKING STUD TYPE MOLDING FASTENER

William A. Bedford, Jr., North Scituate, Mass., assignor to United-Carr Fastener Corporation, Cambridge, Mass., a corporation of Massachusetts Application December 9, 1947, Serial No. 790,668

2 Claims. (Cl. 24—217)

The present invention relates to fasteners, and more particularly to fasteners for securing moldings and the like to an apertured support, and aims generally to improve existing fasteners of that type.

One of the primary objects of the invention is the provision of an improved fastener adapted to be quickly and securely attached to an apertured support and over which a molding may be quickly pressed.

A further object of the invention is the provision of an improved two-part fastener adapted to be secured to a flexible apertured hard surfaced support, which in final assembly with a molding will provide an efficient, simple and water-resistant fastener.

Other aims and objects of the invention will be apparent to persons skilled in the art from a consideration of the accompanying drawings and annexed specification illustrating and describing a preferred embodiment of the invention.

In the drawings:

Fig. 5 is an elevation of the locking stud;

Fig. 6 is a top plan view of the locking stud shown in Fig. 5;

Fig. 7 is a sectional view of the locking stud mounted in unlocked position in the molding fastener, only a portion of which is shown;

Fig. 8 is a sectional view taken at right angles to that of Fig. 7 showing the stud retaining means on the molding fastener;

Fig. 9 is a sectional view similar to that of Fig. 7 showing the stud in locked position; and Fig. 10 is a perspective view of the molding fastener shown in Figs. 3 and 4.

Figure 1:
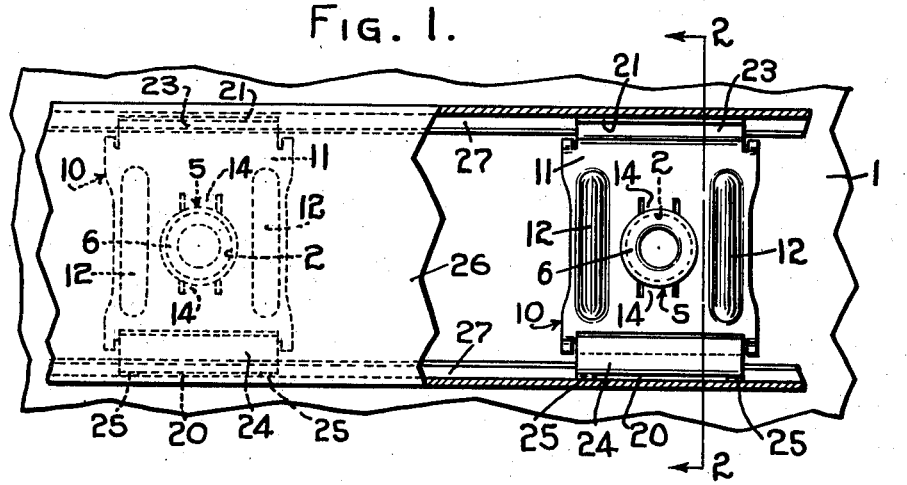
Fig. 1 is a plan view of a molding-secured installation, partly broken away to illustrate the fastener.
Figure 2:
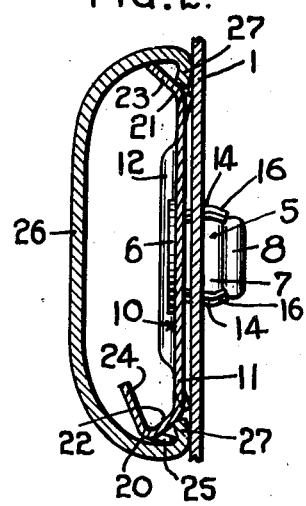
Fig. 2 is a transverse sectional view as taken on the line 2—2 of Fig. 1.
Figure 3:
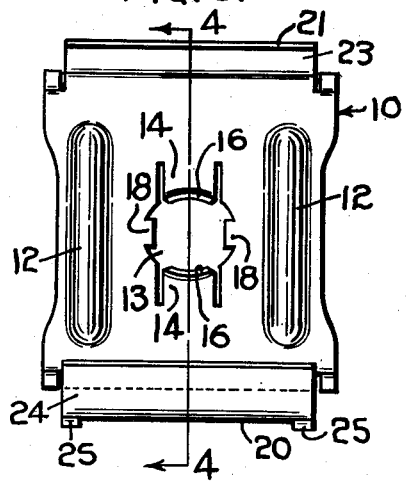
Fig. 3 is a plan view of the molding fastener shown in Fig. 1.
Figure 4:
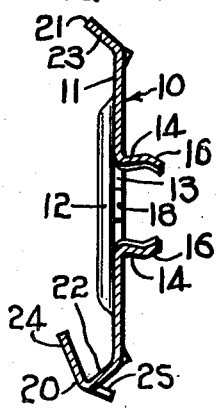
Fig. 4 is a central sectional view of the molding fastener as taken on the line 4—4 of Fig. 3.

Referring to the drawings, the improved fastener is preferably made in two parts comprising a locking stud 5 and a molding fastener 10, the stud serving to lock the fastener to an apertured support 1.

The support 1 is provided with an aperture 2 and may be of any desired material. Because of the secure locking engagement provided by the locking stud 5, the support may be of a flexible hard surfaced material, for example metal or plastic.

The molding fastener 10 is preferably in the form of a plate of sheet material, for example sheet metal, having a substantially flat body portion 11 of relatively large area adapted to make flush-tight surface contact with a face of the support 1 to which it is attached. Preferably the body 11 may be formed with integral transverse reinforcing ribs 12 adjacent opposite sides thereof to add stiffness to the plate body 11 and insure maximum surface contact with the support 1.

The plate body 11 has an aperture within the marginal edges as at 13, adapted to align with the aperture 2 in the support 1 and to receive the locking stud 5 hereinafter described. The plate preferably has a series of relatively long resilient stud-engaging tongues 14 extending angularly beyond a face thereof, and a series of shorter stud-retaining tongues 18.

As herein illustrated, the stud-engaging tongues 14 are a pair of diametrically opposed tongues although it will be apparent that a greater number may be provided if desired. The tongues are integrally joined to the plate body 11 outwardly of the edge of the aperture 13 by slits 15. The tongues extend substantially at right angles to the plate 11 for a distance greater than the thickness of a support 1 to which the fastener is to be attached, and the terminals ends thereof are inwardly curved toward each other as shown at 16.

The stud-retaining tongues 18 are similarly integrally connected to the plate body 11 and are disposed intermediate the tongues 14 within the aperture 13. These tongues 18 extend generally toward the center of the aperture 13 substantially in the plane of the body 11.

The plate is secured to the support 1 by means of a separate locking stud member 5 passed through the aligned apertures 13 and 2 of the plate 11 and support 1, respectively. This stud 5 advantageously may be formed of a single piece of sheet material, for example, metal having a base portion 6, a tubular shank portion 7 normal thereto terminating in a bulbous head 8. The diameter of the bulbous head 8 is greater than the normal distance between the inturned ends 16 of the opposed tongues 14 and the ends of the opposed tongues 18, but the diameter of the shank portion 7 is less than the distance between the ends of the opposed tongues 18. Consequently, when the head 8 is forced through the openings 13 by the opposed tongues 18, the head 8 will stop at inturned ends 16 of the opposed tongues 14 and as a result the stud member 5 will be retained loosely assembled in the aperture 13 to the molding fastener 10 by the tongues 18. The angularly extending tongues 14 of the molding fastener 10 to which the stud member 5 has been loosely assembled as above may be inserted through the aperture 2 of the support 1 so that the plate 11 rests on the support 1. Pressure may be applied to the stud member 5 forcing the base portion 6 against the plate 11 and the head 8 between the inturned ends 16 of tongues 14 thereby forcing the tongues 14 apart so that they grip the sides of the aperture 2 securing the plate 11 against the support 1. The head 8 passes between the inturned ends 16 so that they rest on the shank 7 or the rounded part of bulbous portion 8 adjacent to the shank 7 effectively locking the stud member 5 in position. The base portion 6 having been forced up against the plate 11 and the stud locked in position will act to close substantially the openings 13 and 2 so that the molding and fastener installation is water resistant.

The plate 10 serves as a molding fastener and is provided with molding-engaging fastener means, preferably formed on opposed edges thereof, for example the end edges of the plate. Advantageously, the molding fastener means may comprise an outwardly and inwardly curled flange 20 on one edge of the plate and an outwardly curved flange 21 on the opposite edge of the plate, both of sufficient depth and curvature to conform approximately to the cross-sectional shape of the sides of the molding to be secured. By providing the flanges 20 and 21 with outwardly divergent portions 22 and 23 respectively and flange 20 with an inwardly converging portion 24, the opposed edges of a molding may be snapped over the fastener edges of the plate.

Preferably, the fastener flange 20 is slit inwardly from opposite sides to provide anchoring tabs 25 (Fig. 10) under which an edge of the molding may be positioned and held tightly against the support 1.

The molding 26 may be of any desirable form or construction, and usually comprises a channel-shaped member having inwardly turned flanges 27 along opposite edges.

In use, the molding fastener 10 with the stud member 5 already loosely assembled with it as described above is applied to the support 1 with the aperture 13 thereof and the stud member aligning with the support aperture 2 and the locking tongues 14 extending therein. The head 8 of the stud 5 is then forced through the inturned ends 16 forcing the tongues 14 radially and causing them to grip and bind against the support 1, the stud locking in position as described above.

When a plurality of such plates 10 have thus been attached to the support, the molding 26 may be attached thereto by hooking one inturned edge 27 under the fastener flange 21 and snapping the opposite edge 27 over the fastener flange 20 of the plate 10, the resilience of the metal of the molding permitting slight expansion of the flanges 27 to be snapped over the fastener.

It will be seeen that the construction is simple and may be quickly and easily applied in molding-secured installations.

While I have illustrated and described a preferred construction embodying the invention, I do not intend to be restricted thereto as the scope of the invention is best defined in the appended claims.

I claim:

1. In a fastening device for attachment to an apertured support, a base plate having an aperture, support-engaging fingers depending from opposite side edges of said aperture substantially normal to said plate, the outer ends of the fingers extending angularly toward each other, stud-retaining projections extending inwardly from opposite side edges of said aperture intermediate said support-engaging fingers generally in the plane of said plate, and a locking stud member having a base, a neck portion extending from said base, and an enlarged head on the end of said neck portion opposite said base provided with shoulders adjacent said neck portion spaced from the base a distance substantially equal to the length of the support-engaging fingers, said locking stud member being received within the aperture in the base plate with the neck thereof extending between the support-engaging fingers, the shoulders on the locking stud being engaged by said outer ends of the support-engaging fingers, whereby the locking stud is retained in permanent assembly with the base plate and the support-engaging fingers are spread outwardly of said stud to engage a support.

2. In a fastening device for attaching a part to an apertured support, an attaching stud assembly comprising, a base plate having an aperture, a plurality of resilient fingers disposed at circumferentially spaced points on the edges of said aperture, normally depending substantially normal to said plate, and having their outer ends extending angularly toward each other, resilient projections extending inwardly from circumferentially spaced points on the edges of said aperture intermediate said fingers and disposed generally in the plane of said plate, and a locking stud member having a base flange, a neck portion extending from said base flange, and an enlarged head on the end of said neck portion opposite said base flange provided with shoulders adjacent said neck portion spaced from the base a distance substantially equal to the length of the support-engaging fingers, said base flange being disposed adjacent a face of said base plate opposite said fingers, said neck portion extending through said base plate aperture between the support-engaging fingers, the shoulders on the locking stud being engaged by said outer ends of the support-engaging fingers, whereby the locking stud is retained in permanent assembly with the base plate and the support-engaging fingers are spread outwardly of said stud to engage a support.

WILLIAM A. BEDFORD, Jr.

References Cited in the file of this patent

UNITED STATES PATENTS

| Number | Name | Date |
|---|---|---|
| 1,044,110 | Williams | Nov. 12, 1912 |
| 1,209,019 | Pfeiffer | Dec. 19, 1916 |
| 1,751,239 | Johnson | Mar. 18, 1930 |
| 1,944,513 | Johnson | Jan. 23, 1934 |
| 2,141,892 | Wilson | Dec. 27, 1938 |
| 2,221,124 | Wiley | Nov. 12, 1940 |
| 2,318,840 | Del Camp | May 11, 1943 |
| 2,330,675 | Brown | Sept. 28, 1943 |
| 2,424,265 | Allen | July 22, 1947 |